Feb. 23, 1937.　　　　　J. EHRLICH　　　　　2,071,785
CONTROL FOR FRICTION TRANSMISSION
Filed March 12, 1932　　　5 Sheets-Sheet 1
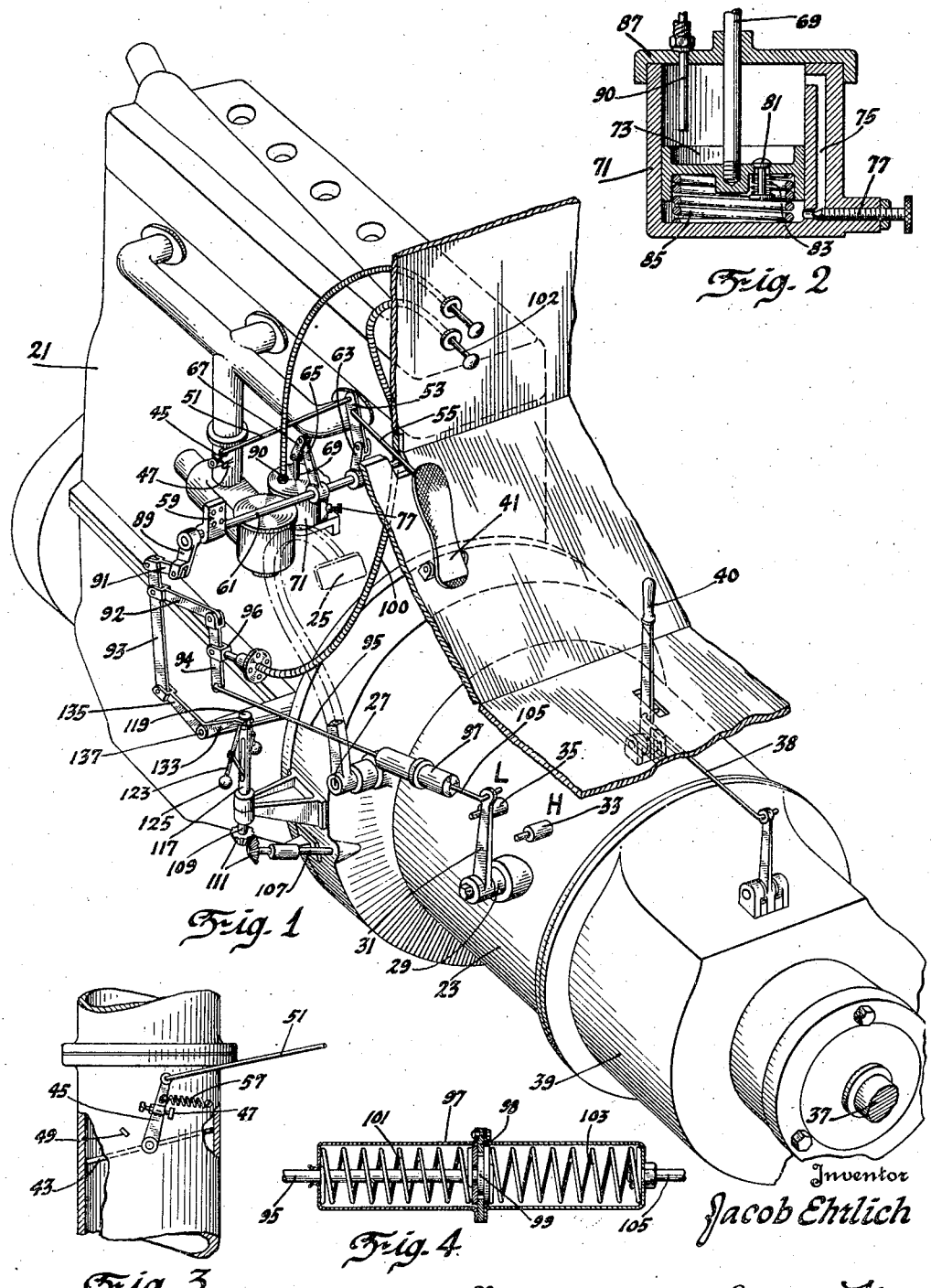
Inventor
Jacob Ehrlich
By Blackmore, Spencer & Fluck
Attorneys Feb. 23, 1937.  J. EHRLICH  2,071,785
CONTROL FOR FRICTION TRANSMISSION
Filed March 12, 1932  5 Sheets-Sheet 2
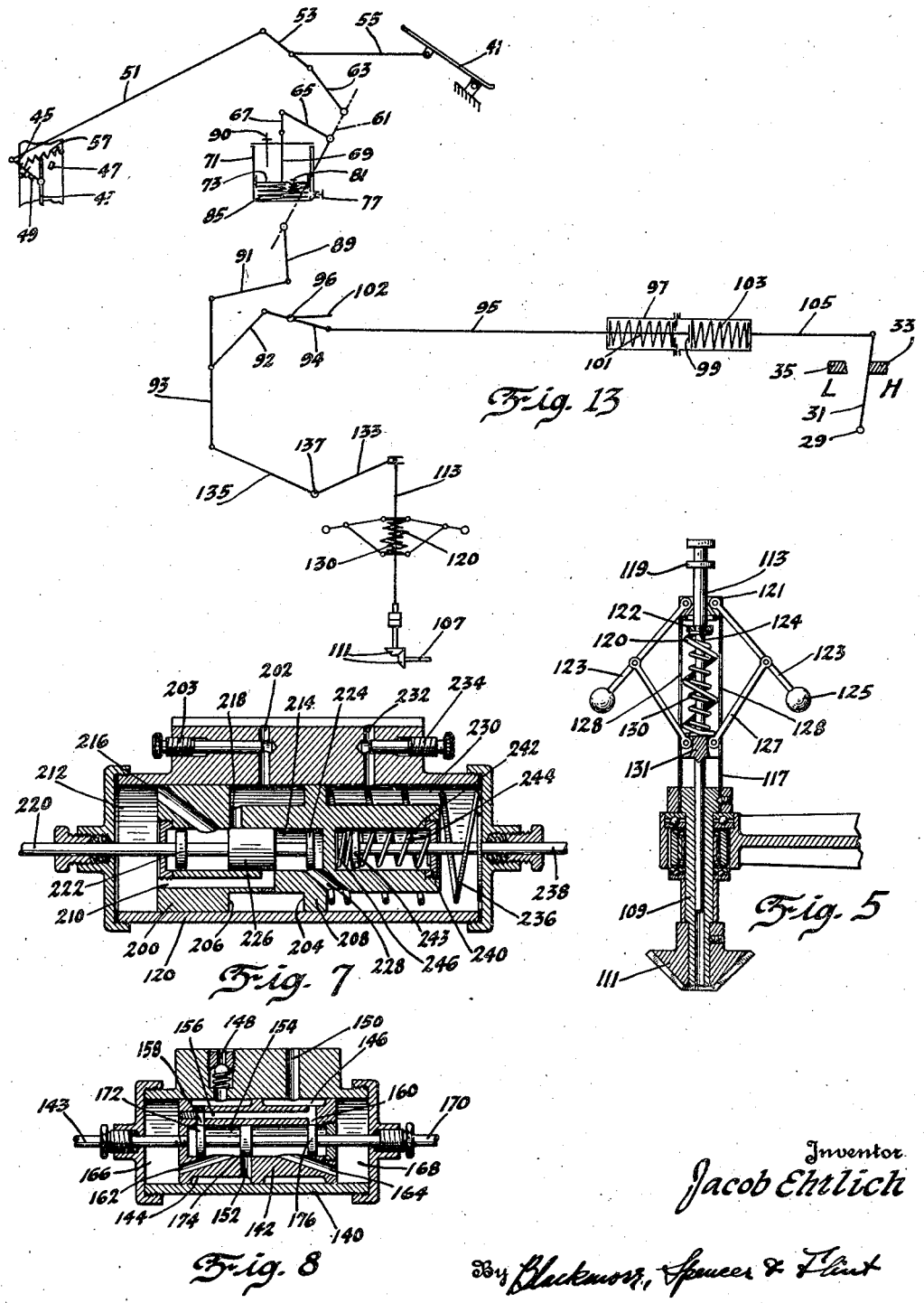
Inventor
Jacob Ehrlich

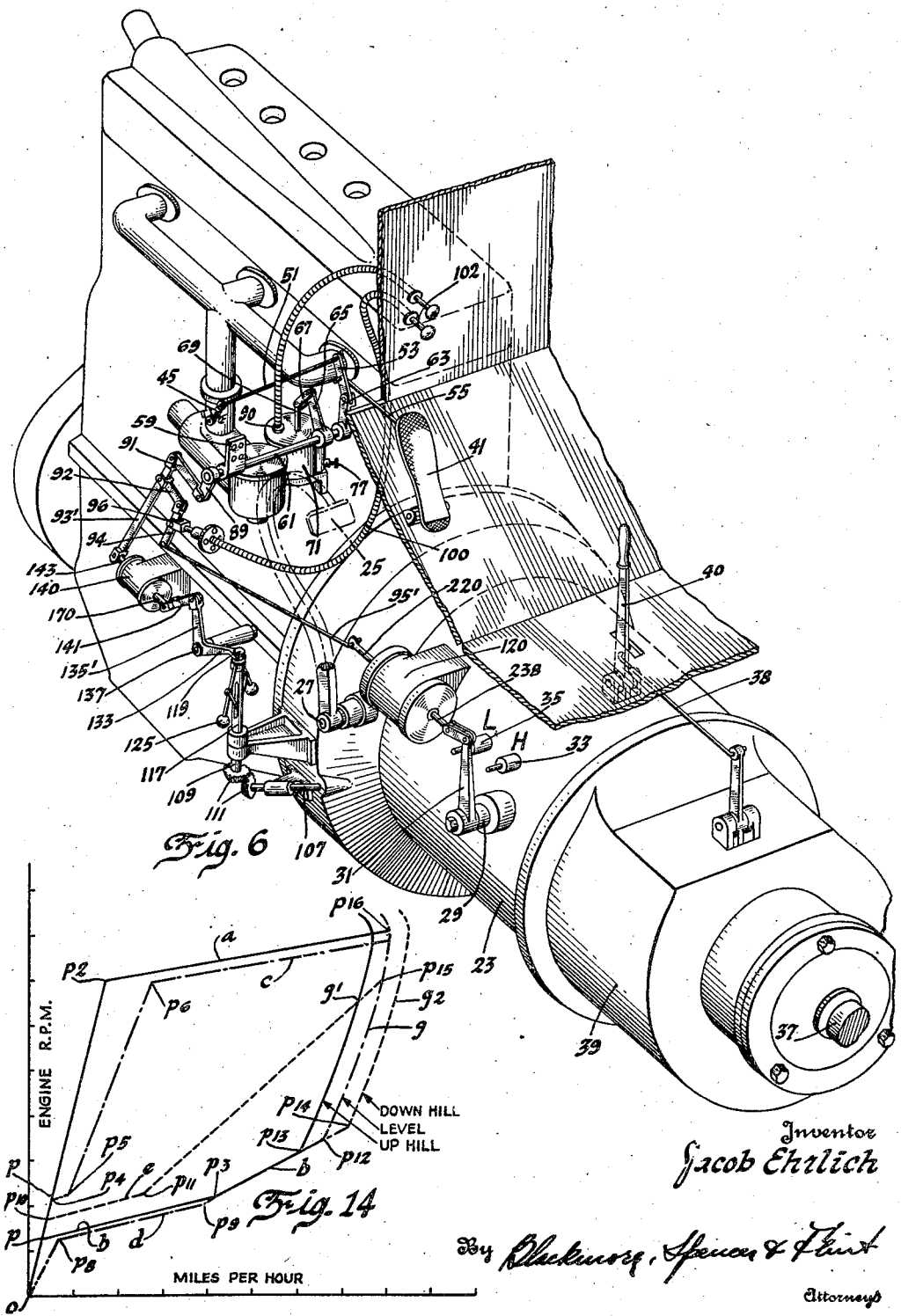

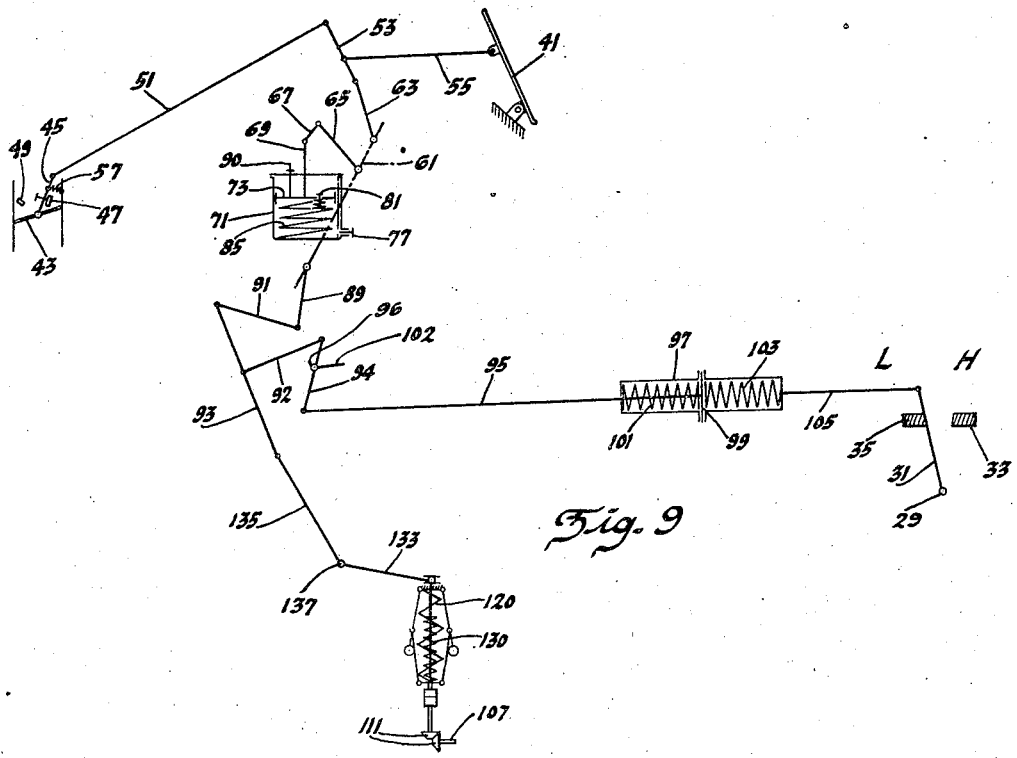
Fig. 9
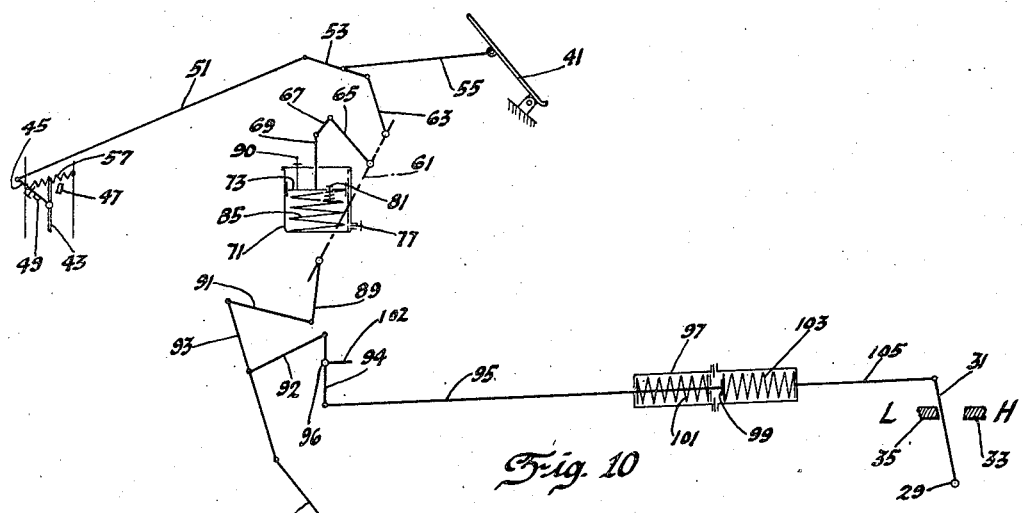
Fig. 10
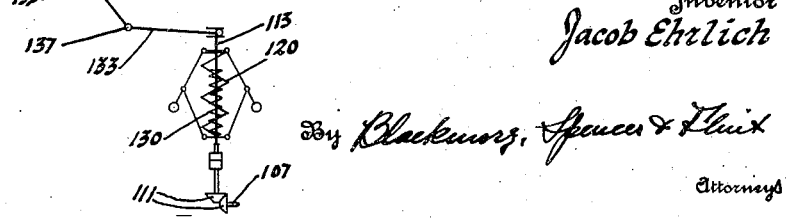

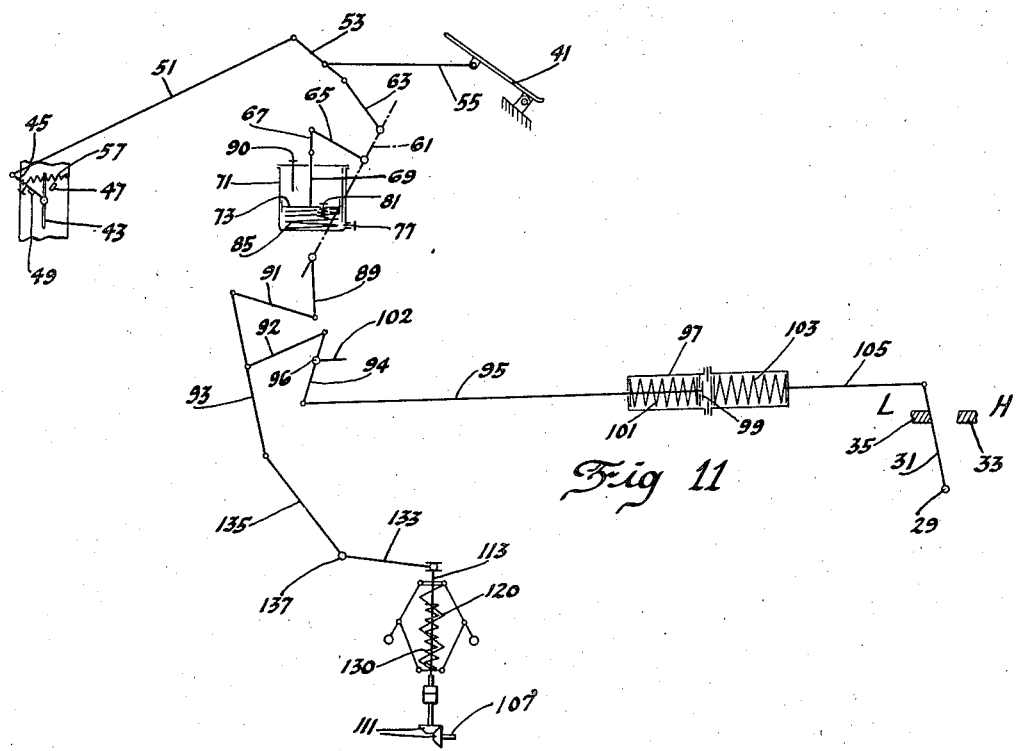

Patented Feb. 23, 1937

2,071,785

UNITED STATES PATENT OFFICE 2,071,785

CONTROL FOR FRICTION TRANSMISSION

Jacob Ehrlich, Detroit, Mich., assignor, by mesne assignments, to General Motors Corporation, Detroit, Mich., a corporation of Delaware Application March 12, 1932, Serial No. 598,350

23 Claims. (Cl. 74—472)

This invention relates to means for controlling the operation of a motor vehicle equipped with an internal combustion engine and also with a variable speed ratio transmission between the engine and the traction wheels of a vehicle.

The principal objects of the invention are to obtain maximum vehicle performance when desired and to improve economy under ordinary driving conditions.

Other objects include the provision of adjustable means for varying the control characteristics; the simplification of the operator control; mechanism to control the rate of shifting; mechanism to provide variable engine braking; the use of supplementary servo mechanism to reduce manual effort and to make it possible to use a relatively small size governor; and the provision of means to limit transmission stresses.

Still other objects and advantages will be understood from the following description.

The invention is illustrated on the accompanying sheets of drawings on which—

Fig. 1 is a perspective view illustrating a manual control and a governor mechanism applied to an automobile engine and its related transmission mechanism.

Fig. 2 is a sectional view of a dashpot constituting an element of the control mechanism.

Fig. 3 is a detail in elevation partly broken away of the engine throttle valve.

Fig. 4 is a view in longitudinal section of an elastic coupling device constituting a part of the linkage between the ratio control arm of the transmission mechanism and a member operated either by the governor or the control lever.

Fig. 5 is a vertical sectional view of a governor.

Fig. 6 is a view in perspective, similar to Fig. 1, but with the addition of a booster or servo motor included in the control mechanism.

Fig. 7 is a longitudinal section through an hydraulic booster or servo motor constituting a detail of the mechanism shown in Fig. 6.

Fig. 8 is a sectional view through a booster used with the governor.

Figs. 9–13 inclusive are diagrammatic views intended to illustrate several steps assumed by the parts in the operation of the device.

Fig. 14 is a diagram illustrating differing methods of operation.

Referring by reference characters to the drawings, numeral 21 represents a conventional internal combustion engine of an automobile. The engine includes the usual parts and accessories which need not be referred to specifically. Any preferred form of clutch may be housed between the engine crankshaft and the special transmission which is within the housing 23. The clutch may be disengaged as usual by a pedal 25 rocking a shaft 27. The transmission may be of a known infinitely variable type, and preferably one providing an overdrive and an underdrive between the input shaft and the output shaft. The several ratios between the input and output shafts are obtained by rocking a shaft 29 projecting from the housing 23, this shaft having a control lever 31. Two stops 33 and 35 limit the movements of the lever 31, stop 33 representing that position of the control arm 31 for the high or overspeed ratio between the input and the output shafts. Stop 35 represents the low driving ratio. To obtain forward, neutral, and reverse drives substantially conventional gear mechanism may be located within gear box 39. This gearing need not provide any change speed ratios. It may be operated by a lever 40 acting through linkage 38. The invention herein is concerned with the control of such a transmission as has been briefly outlined above.

Upon the floor board of the car is a lever 41, shown as a pedal, which may be regarded as corresponding in a general way to the accelerator of a conventional motor vehicle. The function of this lever 41 differs from that of the usual accelerator pedal.

The throttle valve 43, shown best in Fig. 3, is operated by a lever arm 45 which engages a stop 47 in its closed or idling position. Another stop 49 is used to limit the opening movement of the throttle. From the end of arm 45 a link 51 extends to the end of a differential lever 53. This lever is so designated inasmuch as it may fulcrum about either end. From an intermediate point on lever 53 a link 55 extends to the pedal 41. A spring 57 normally holds the throttle in idling position.

Journaled in any suitably mounted supports, one such support being shown on the drawings by numeral 59, is a rock shaft 61. Rock shaft 61 has an arm 63 pivotally carrying the end of inner differential lever 53. On rock shaft 61 is another arm 65. This arm is connected by a link 67 with a piston rod 69 entering a cylinder 71 supported in any convenient manner. The cylinder 71 carries a piston 73 to which the rod 69 is connected. Within the wall of the cylinder is a bypass 75 controlled by an adjustable needle valve 77. The piston has an opening seating a valve 81. The valve is held to its seat by a spring 83. A spring 85 engages the piston and the bottom of the cylinder and functions to press the piston 73 upwardly toward the top 87. Through the top extends an adjustable stop 90 to engage the piston 73 and limit the upward movement thereof and the rocking of shaft 61.

Beyond the shaft bearing 59 the rock shaft 61 has still another arm 89. This arm is connected by a link 91 with a differential lever 93. Extending from a mid portion of this lever 93 is a rod 92 connected to one arm of a lever 94, the other arm of which is connected to a rod 95 which enters a two-part cylinder shown in section in Fig. 4. Lever 94 has a fulcrum 96. Provision is made to move this fulcrum to the right from its normal position as shown by any suitable means 100 operated by a manually movable member 102 conveniently located for manipulation by the operator of the car. It may also be moved from normal to the left for a purpose to be explained. Rod 95 terminates in a head 99 midway between the adjacent ends of two springs 101 and 103 seated against the ends of the cylinders and engageable at their adjacent ends with an abutment 98. From the further end of cylinder 97, the end remote from the rod 95, there extends a rod 105 which is connected to the arm 31 as shown.

From within the transmission housing there extends a shaft 107. Although not illustrated in the drawings this shaft within the housing is suitably geared to the transmission input shaft in any way found convenient. A suitably journaled vertically arranged shaft 109 is driven from shaft 107 by bevelled gears 111. The vertical shaft has associated therewith a governor. This governor is best illustrated in Fig. 5. A governor shaft 113 has its lower end reciprocably mounted within shaft 109. A tubular member 117 is secured to the end of shaft 109. A collar 119 is carried on the upper end of shaft 113. At the top of the tube 117 is a fixed head 121 to which are pivoted links 123 carrying weights 125. Other links 127 are pivoted to intermediate points of the first links 123 and their adjacent ends are pivoted to an enlargement 131 on the shaft 113. As clearly shown the links 127 extend through openings 128 in the tubular member 117. Obviously as the speed of the engine increases the collar 119 rises. The action of the governor under the influence of the input shaft is resisted by two springs 120 and 130. 120 is under initial compression and is located between the enlargement 131 and the part 121. The spring 130 is a stiffer spring. It is preloaded and comes into action only after a predetermined speed of the engine. This spring engages enlargement 131 and a slidable abutment 122 held by a stop 124. A bell crank lever represented by numerals 133 and 135 applied to its two arms is rotatably supported upon a suitable shaft 137. The arm 133 is provided with a fork-engaging collar 119. The arm 135 is connected to the lower end of the second differential lever 93.

It will be observed that the increasing speed of the governor tends to raise rod 113 and rotate differential lever 93 about its upper end in a clockwise direction. Such swinging of part 93 operates through rod 95 to move the control lever 31 toward its high speed position. It will also be seen that the first movement of the accelerator pedal functions to rotate differential lever 53 about its lower end in a counter-clockwise direction and thereby to open the throttle. This action takes place because the spring 85 within the dashpot is a stiffer spring than the spring 57 controlling the throttle valve 43. It will also be seen from an inspection of the drawings that after the throttle is opened to its widest position further depression of the pedal may rotate differential lever 53 about its upper end and thereby rotate rock shaft 61 and in so doing move the piston 73 downwardly in the dash-pot. This action is resisted only by the spring 85 of the dashpot since the bypass 75 and the valve 81 permit substantially free passage of fluid from the region below to the region above the piston. This rotation of rock shaft 61 operates through the second differential lever 93 to rotate the same about its lower end and exert tension upon rod 95 which is operable to move the rod 105 to the left and thereby rock control lever 31 to low speed position.

It should be explained that the dashpot functions to prevent too rapid shifts into high speed ratio when decelerating from a condition in which lever 31 has been depressed below full throttle. When the foot is removed from the pedal in the act of decelerating the dashpot resistance clearly permits an immediate closing movement of the throttle. There is then a subsequent and slower rocking movement imparted to shaft 61 by the spring beneath the dashpot piston. This is as it should be. The throttle should be closed at once and the delayed upper movement of the dashpot piston ensures this action through the instrumentality of the differential lever 53. The rotation of shaft 61 by the upward movement of the dashpot piston rod tends to rotate lever 31 to a high ratio position. Such a rotation to high speed position if unchecked would forcibly slow down the engine, but owing to the inertia of the engine it might react to become a force accelerating the car just when deceleration was intended. Obviously as the engine approaches its idling position the governor will hold the control lever 31 in the low ratio position as shown in Fig. 9.

The operation of the device may best be understood by considering the several steps illustrated by the diagrammatic views, Figs. 9–13 inclusive.

It may be assumed that the gear trains within housing 39 have been so operated by lever 40 as to provide for forward or reverse driving as the operator may wish. It will also be assumed that the adjustable parts 90 and 96 are in their normal positions as shown, fulcrum 96 being at the left end of its range of adjustment and part 90 in its uppermost position. The clutch may then be released by pedal 25 and the engine started. The clutch will then be re-engaged to start the car. Prior to any considerable depression of the pedal 41 the parts are as shown in Fig. 9. The throttle is being held in its idling position by spring 57, and the governor spring 120 is strong enough to hold control lever 31 in the position corresponding to low speed. The depression of the pedal then opens the throttle, moving it from the position shown in Fig. 9 in a direction toward that of Fig. 10. As the throttle valve turns to its wide open position shown in Fig. 10, the engine speed increases and the governor tends to turn the control lever from its low ratio to its high ratio position. It is restrained from doing so at the first stage of the action by the resistance of spring 120. This serves to hold the lever 31 in low until a predetermined engine speed has been reached. Fig. 10 shows the governor as having just begun to overcome spring 120 and make the shift from low toward high.

Fig. 11 shows a further operation of the pedal made after the parts are in the position shown by Fig. 10 in an effort to get greater acceleration and engine performance. The pedal has been depressed to overcome the dashpot spring, this action taking place by the pivoting of lever 53 about its upper end. The rocking of shaft 61 functions to turn lever 31 back to its low speed position, thereby securing high engine speed for rapid acceleration. In so doing it develops a clearance between springs 101 and 103.

Fig. 12 shows the pedal in the same position. In this figure the resistance of the lighter governor spring has been fully overcome and the lever has been shifted toward its high speed position, giving increasing car speed with slightly increasing engine speed during the process of overcoming the light spring. As the governor changes from its condition shown by Fig. 11 to that of Fig. 12 it has first taken up the clearance between springs 101 and 103 and then has shifted the lever.

In Fig. 13 the pedal is still as in Fig. 12. The engine speed is such that both governor springs have been overcome and the speed ratio is being held in high by the governor.

The operation may be made clearer by reference to Fig. 14 which illustrates the effects of unlike pedal manipulation. The operator may depress the pedal to the floor. In so doing he opens wide the throttle and rocks shaft 61 to manually exert pressure through spring 101 to hold the lever 31 in low. Since the governor spring 120 is already holding lever 31 at its position of lowest ratio there occurs a clearance between springs 101 and 103 by this operation. It should be here explained that with the normal adjustment of 96 the full pedal depression separates springs 101 and 103 to an extent which is just taken up by the governor in the act of overcoming the light spring 120. Letter $a$ represents the curve corresponding to this operation. When the engine speed reaches a point high enough to overcome the light spring of the governor the clearance begins to be taken up but the ratio remains in low. This point on the curve is marked $p$. $p'$ represents the point on the curve corresponding to the completion of the process of taking up the clearance between springs 101 and 103 and also to the condition of the governor where the light spring is fully overcome. After the clearance is thus taken up, the governor is still unable to shift because at that time it meets the resistance of the stiffer spring 130 as explained. When the engine speed is sufficient to overcome the stiffer spring the governor takes control and checks the increasing engine speed by changing the ratio toward high until the car reaches its maximum speed. This point on the curve is marked $p^2$. This operation gives maximum car performance.

On the other hand, the operator may depress his pedal to a position not beyond full throttle as in Fig. 9 and Fig. 10. There is then no clearance between springs 101 and 103. Up to point $p$ on the curve $a$ the same conditions prevail because the governor spring, unaided by the manual effort, will hold the driving ratio to low speed. At point $p$ the governor begins to overcome spring 120 and, since there is no clearance to be overcome, the governor at once begins to control the ratio with the result of checking engine speed and increasing car speed. This continues up to the time that the stiffer spring resists the governor which is coincident with the attainment of maximum overdrive with lever 31 on the high ratio stop. This range of action is shown as between points $p$, $p^3$ on curve $b$. It will, of course, be apparent that the character of the curve depends upon the characteristics of the springs and is merely illustrative. At $p^3$ the ratio is at its maximum but the heavier governor spring has not been overcome. The engine and car ratio remain unchanged and both engine and car accelerate until the car reaches its maximum speed for this position of the pedal. At $p^{12}$ the maximum car speed is reached for a level road. If there is a grade to be overcome the maximum car speed may be reached at $p^{13}$. If the road is down grade the maximum speed may be reached at $p^{14}$.

These points $p^{12}$, $p^{13}$, and $p^{14}$ represent the maximum car speeds for different road conditions provided the pedal is not depressed beyond full throttle. To get added car speed it becomes necessary to speed the engine to a greater extent. To do this, the pedal 41 is further depressed with the effect of shifting the ratio toward low speed. Curves $g$, $g'$, and $g^2$ represent the effect on car speeds of increasing the engine speed by depressing the pedal beyond full throttle. If the curve $g$ be considered (this being the curve representing the change effected by depressing the pedal beyond full throttle when traveling on a level road) it will be understood that at point $p^{15}$ the heavy spring begins to be overcome. The action of the governor in overcoming the combined springs may be nullified by pedal depression tending to shift toward low. In this way point $p^{16}$ may be reached which represents the maximum car speed. This point coincides with the maximum car speed which may be reached by operating on curve $a$, the assumed ultimate car speed with full engine power.

In addition to curves $a$ and $b$, Fig. 14 shows other curves which illustrate modifications which may be made by making adjustments. One of these adjustments is effected by a manual manipulation of the fulcrum 96 of lever 94. The other is had by changing the position of stop 90 to variably determine the rotation of shaft 61. The drawings show parts 90 and 96 in their normal positions. Part 90 is in its uppermost position from which it may be moved down. Part 96 is in its left end position from which it may be moved to the right.

If the adjustment 90 be left unchanged, the effect of an adjustment at 96 may be examined. Fulcrum 96 is then to be considered as moved to the right. This adjustment shifts cylinder 97 to the right and lever 31 is moved from its low ratio stop where it was being held by the governor spring 120. With this seating of part 96, there may be considered the resulting curve when operating, first, with fully depressed pedal and, second, with the pedal at full throttle only. (1) Remembering that lever 31 has been moved to some extent from its low position, the full pedal depression rocks it back to low. The first part of the pedal movement, below the full throttle position of the pedal, moves the cylinder bodily to the left and the lever to its low ratio stop. The latter part of the pedal movement compresses spring 101 and creates a clearance between the springs, but a clearance of less extent than in the case of the pedal depression without the adjustment at 96. As the engine accelerates the curve corresponds to curve $a$ to point $p$ where the weaker spring begins to yield to the increasing engine revolutions. On curve $a$ it was point $p'$ where the weaker spring was overcome in the case previously considered. In that case the clearance between 101 and 103 was just enough to accommodate the governor in its movement of overcoming the weak spring. In the present case the clearance is less than before and, in consequence, there is a point on curve $a$ and marked $p^4$ (below $p'$) corresponding to the taking up of the clearance between the springs 100 and 103. From this point $p^4$ the governor is able to shift the lever tending to reduce engine speed, increase car speed, and flatten the curve. From $p^4$ to $p^5$ the governor is controlling the curve.
At $p^5$ a condition has arisen where the governor meets the resistance of 130 just as it did at $p'$ in the case first described. From $p^5$ the governor is ineffective to increase the driving ratio and the curve continues to $p^6$, this point representing the condition where the engine speed is such that for any increment thereof the governor will shift the control lever toward high speed. The curve then flattens from $p^6$, the range beyond this point being within the control of the governor. This curve is marked $c$.
    (2) If instead of fully depressed pedal the pedal be depressed to full throttle position only, the following results occur as a result of the same adjustment of part 96. The movement of 96 to the right shifts lever 31 from its low ratio position as before and there it remains since the pedal is not to be depressed below its full throttle position to rotate the lever 31 back against the low ratio stop. As the engine accelerates it operates therefor at a new driving ratio determined by this new position of the lever 31. This ratio remains in effect until the engine speed reaches the point at which the governor may overcome the weaker spring. This part of the curve $d$ is shown at $o$—$p^8$. Since the ratio is higher than before the curve makes a lesser angle with the base line. From $p^8$ to $p^9$ is the region corresponding to the overcoming of spring 120. From $p^9$ the ratio is unchanged owing to the engagement of lever 31 with the high ratio stop. Governor motion then overtravels lever motion, compressing spring 103 until it encounters the resistance of spring 130. Thence the ratio remains in maximum overdrive to point $p^{12}$.
If instead of adjusting part 96 this part be left in its normal position, the effects of adjustment of stop 90 may be considered. First, if stop 90 is moved down while part 96 remains in its normal position and if the pedal 41 is pushed clear down to the floor the curve is like curve $a$. The act of adjustment in this case may be thought of as the equivalent of the first part of the pedal depression in the case illustrated by curve $a$. Secondly, with the same downward adjustment of stop 90 and the part 96 in its normal position, the pedal may be depressed to full throttle position only and the resulting curve is marked $e$. In this case the lever 31 is being held in low by spring 120. The downward adjustment of stop 90 is effective to pull 95. There follows a compression of spring 101 and the development of a clearance between springs 101 and 103. Since the lever 31 is on the low stop as the engine accelerates, the same curve $a$ is followed. As the engine accelerates its speed reaches the point where the governor is able to overcome spring 120. This is point $p$ on curve $a$.
    The action of the governor in overcoming the spring 120 operates in two stages. The first stage takes up the clearance at which time the point $p^{10}$ is reached. Thereafter it shifts the control lever toward high ratio position and the curve $p^{10}$, $p^{11}$ illustrates this effect. At $p^{11}$ the stiffer spring prevents further increase in ratio and does so before the high ratio position is reached. The curve then continues for the fixed ratio attained.

It will be apparent that whenever operating at full throttle only and when the conditions are as represented at any points on the curves $b$ and $d$, for example, the pedal may be depressed to get the advantages of the higher engine speeds with the consequent greater acceleration and car performance. Such an operation really means shifting from a curve of greater economy to one of superior performance.

It will be noted that normal adjustments for full pedal depression gives maximum acceleration and performance, and operation with full throttle only affords a high degree of economy. Greater economy may be secured by the adjustment of the fulcrum 96. This is shown by comparing curve $c$ with $a$ and also by comparing curve $d$ with $b$. An intermediate efficiency curve is that shown at $e$ which illustrates the effect of the adjustment of the stop 90 and the operation at full throttle only. Obviously the combination of these adjustments may be represented by other curves.

Continued downward adjustment of part 90 also serves as a means (see curve $e$ for example) for obtaining greater engine braking in going down long hills. Further movement of 96 to the left beyond its normal setting gives a like change in control characteristics. The action of the two adjustments thus overlap and may be interchanged insofar as full throttle operation is concerned (curves $b$, $d$, and $e$). Adjustment of 90, however, does not effect operation with fully depressed pedal 41. Adjustment of 96 serves mainly as a means for varying the maximum engine speed (pedal 41 fully depressed) with coincident change to full throttle operation. Adjustment of 90 is mainly to serve as a means for varying the full throttle operation without effecting the maximum engine speed (pedal fully depressed).

In Figs. 6, 7, and 8 is shown a modified form in which fluid pressure means is employed for operating the mechanism. In general, correspondent parts are used and are represented by the same reference characters. Rod 95', corresponding to 95, operates the lever 31 by means of a fluid pressure unit 120 shown in detail in Fig. 7. The governor rocks lever 93' by a power unit 140 shown in Fig. 8.

The latter power unit 140 will first be described. This unit is in the form of a cylinder in which reciprocates a piston 142 having annular grooves 144 and 146. A valve inlet 148 affords communication with groove 144 from a suitable source of fluid pressure, the pressure lubricating system of the vehicle for example. Numeral 150 represents a passage from groove 146 to the sump. The piston has a passage 152 from the groove 144 to a central chamber 154. There is a bypass 156 having openings at its ends 158 and 160 communicating with the ends of chamber 154. This bypass also communicates with the annular groove 146 at its end. Angular passages 162 and 164 afford communication between the central chamber 154 and the chambers 166 and 168 at the ends of the cylinder beyond the piston. Piston 142 is connected to rod 143 which is pivoted to the lever 93'. Bell crank arm 135' is connected by a link 141 to a valve rod 170. This rod reciprocates through the ends of the cylinder and piston adjacent the bell crank. It has three heads 172, 174, and 176 within the chamber 154. When the governor speed drops its spring acts, through the bell crank, to pull valve rod 170 and move head 174 from over the passage 152. Oil under pressure then flows from the valve inlet 148, annular groove 144, passages 152 and 162 to the end chamber 166. At the same time the movement of the heads 172 and 176 permits the flow of fluid through the bypass. Fluid pressure in chamber 166 then moves the piston to the right, since the free flow of fluid from chamber 168 is permitted by passages 164, 160, 146, and 150. The movement of the piston 142 to the right rocks the differential lever 93' just as lever 93 was rocked by the corresponding bell crank in the form shown in Fig. 1. The governor thus holds the driving ratio in low when the engine is idling. The operation of the governor in a reverse direction to shift toward high speed ratio is dependent upon its ability to overcome the preloaded springs as before. Such action reverses the movement of the piston in an obvious manner. When rod 170 is moved to the left as the engine speed increases, fluid under pressure enters chamber 154 from the passage 152 and passes through passage 164 to the end chamber 168, thereby operable to move the piston to the left. In the meantime the bypassing of fluid in chamber 154 is permitted as is also the free passage from end chamber 166 through passages 162, 158, 156, 146, and 150. It will thus be seen that the governor and its springs merely function to move rod 170, the actual operation of the shift mechanism being obtained by fluid pressure through the fluid booster unit. It will also be apparent that the fluid pressure is progressive. Each movement of the rod 170 is followed by such a movement of the valve 142 as to restore the parts to the previous inoperative position, further movement of the piston requiring further movement of the rod 170.

The power unit 120 is operable to shift the lever 31. This power unit comprises a cylinder in which moves a piston 200. An adjustable inlet 202 controlled by valve 203 extends through the cylinder wall to an annular groove 204 in the wall of the piston, this groove being defined by end walls 206 and 208. A passage 210 leads from one end chamber 212 of the cylinder to an inner chamber 214 within the piston. From the chamber 214 an angular passage 216 leads to the end chamber 212. There is also a radial passage 218 from the annular groove 204 to the inner chamber 214. Rod 95', extending from the lever 94, is connected to a valve rod 220 which extends through the adjacent cylinder end and also through the adjacent end of piston 200. This rod, within the chamber 214, has heads 222 and 224 which are located adjacent the ends of chamber 214. It also has a larger intermediate head 226. The edges of head 226 may be beveled to secure a gradual valve opening, if desired. From chamber 214 adjacent head 224 a passage 228 leads to the end chamber 230 which may be as shown in communication with the sump by a passage 232, the dimensions of which are controllable by valve 234. Within the end chamber 230 is a spring 236 engaging the end of the cylinder and the wall 208. A rod 238 is to be connected to the lever 31 as shown. This rod extends through the adjacent end of the cylinder, through the chamber 230 and through a closure 240 at the end of a second inner chamber 242 of the piston. Rod 238 has a head 243 within the chamber 242, and springs 244 and 246 are located on opposite sides of the head and in engagement with the end walls of the chamber 242. Movement of rod 220 to the left permits the escape of fluid from chamber 212 through passages 210, 228 to the drain outlet 232 whereby the spring 236 operates to move the piston to the left, and through the spring 244 the rod 238 is pulled to make a shift toward low speed. For the opposite shift the rod 220 is moved inwardly permitting oil under pressure to pass through passages 202, 204, 218, 216 to the chamber 212, thereby moving the piston to the right. Chamber 230 is vented through passage 232. The movement to the right is operative through spring 246 upon the head 243 to move the rod 238 and shift toward high speed. The ports are self-closing as in the case of power unit 140 and the action is progressive as explained in connection with that booster unit.

Together with this operation by fluid pressure the same adjustments are to be used. The dashpot stop 90 may be manually adjusted to limit, at will, the amount of overgear by limiting the inward movement of rod 220. The pivoted lever 94 may be adjusted to secure the same result and also to effect a change in the maximum governed speed without the need of substituting a new spring in place of governor spring 120. The range of action of the governor in overcoming both springs 120 and 130 is such that full range of ratio changes of the transmission may be had for any position of adjustment of the fulcrum of lever 94. It is intended that 222 shall not engage the end of the piston to bodily move the same, the bodily movement being effected by the spring 236.

In some types of transmission for driving at a constant ratio, the transmission may exert on its control lever 31 a force proportional to the driving torque transmitted through the transmission. Also, during the process of ratio changing, the transmission is subjected to inertia forces which are proportional to the rate of shifting. Springs 244 and 246 are used to resiliently resist these forces applied to the lever 31 when the torque is acting through rod 238 and thus to resist the rate of shifting and thereby to avoid overloading the transmission and possible slippage. In the event that lever 31 is not subject to transmission torque, the rod 238 is shifted in both directions by the springs which also function to limit the shifting force.

There is another purpose for the use of springs 244 and 246 in case of the torque-conscious control. To accelerate a car at maximum rate, the engine must be brought to its speed of power delivery as rapidly as possible. To do this the transmission ratio must be decreased at a rate to permit the engine to accelerate freely without car load. If springs 244 and 246 are omitted the control rod 238 can float freely in the chamber 242, and the control lever 31 can follow up the movement of piston 200 to the left at its own independent rate such that no driving torque is transmitted through the transmission, due to the fact that no external force is acting on lever 31, assuming, of course, a transmission in which there is an inherent tendency to shift toward low when the engine is driving the car. By properly selecting these springs a wide range of shifting characteristics may be obtained. If the transmission is shifted at a slower rate than that corresponding to the acceleration rate of the non-loaded engine, some of the engine power will be delivered to the car during the period of engine acceleration. This result may be obtained by making the spring 246 of such strength that it exerts a force on head 243 throughout its full range of travel in the chamber 242. If the transmission is shifted at a rate in excess of the rate of acceleration of the non-loaded engine some of the car momentum will be used to accelerate the engine. This result may be obtained by making spring 244 of such strength that it exerts a force on head 243 throughout the full range of its travel in space 242 thus aiding the torque reaction on lever 31 acting through rod 238.

With the use of such springs then, and when the transmission is delivering torque to the rear wheels, the transmission ratio existing is a function of the position of piston 200 and of the torque reaction on lever 31 tending to move rod 238 inwardly. The latter is a function of the driving torque which is being delivered to the transmission. Such an arrangement requires that the travel of piston 200 to the left due to the manual pedal shift toward lowest driving ratio be limited for the following reason: When the driving torque through the transmission is zero or is reversed as when slowing up the car, the torque reaction on lever 31 either has no material effect or else acts to swing the lever toward its high speed position as the case may be. As a result the driving ratio corresponding to a given position of piston 200 tends to be higher than previously. To obtain a full shift into low speed by the governor when stopping the car, the governor must, when collapsing, cause sufficient additional travel of the piston 200 (beyond that obtainable by the manual shift to low) to force the lever 31 to the full extent of its travel to low speed position. Rod 238 must be forcibly pressed inward and to the left by the governor action to overcome forces operating from the transmission tending to move rod 238 to the right in Fig. 7.

Another operation may be had by the adjustment of the lever fulcrum 96. When the car is being brought to a stop a movement of this fulcrum to the left may be employed to positively shift the ratio toward low speed before the governor operates to so position it. As a result the tendency to accelerate the engine by the introduction of a low speed ratio reacts, owing to the inertia of the engine, on the car speed and decelerates the same. A similar effect may be secured by a downward adjustment of 90. On hills, these adjustments make it possible to use the engine very effectively as a brake.

The rate of shift toward low speed can be controlled by restricting the oil drain passage by means of the valve 234. On the other hand adjustment of the valve control inlet 202 by the valve 203 is operable to control the rate of shift toward high speed.

I claim:

1. In a motor vehicle, the combination of an engine with an infinitely variable speed ratio transmission, means for regulating the speed of the engine, means for varying the ratio of the transmission, means including a manually operable member and a differential lever mechanically connected thereto to effect, first, an actuation of the engine speed regulating means and thereafter, by a continued movement of the manually operable member in the same direction, an operation of said transmission ratio varying means.

2. In a motor vehicle, the combination of an internal combustion engine with an infinitely variable speed ratio transmission, a throttle valve for regulating the supply of combustible mixture to the engine, transmission ratio control means, a car control device adapted to be operated by the driver, and operative connections between the car control device, said throttle and said transmission ratio control means, said connections including a differential lever, said control device being operable by means of applied pressure to rock said lever in one direction and also operable by additional pressure in the same direction to oppositely rotate the lever and control the transmission ratio control means.

3. In a motor vehicle, the combination of an internal combustion engine with an infinitely variable speed ratio transmission, a throttle valve for regulating the supply of combustible mixture to the engine, transmission ratio control means, a car control device adapted to be operated by the driver, and operative connections between the car control means constructed and arranged to open the throttle a predetermined extent before effecting any change in the transmission ratio, and thereafter to adjust the transmission ratio while holding the throttle open to said predetermined extent, said connections including differential levers.

4. In a motor vehicle, the combination of an engine with an infinitely variable transmission having an input shaft, means for regulating the supply of fuel to said engine, means for varying the driving ratio of said transmission, a manually operable member to control said fuel regulating means, a governor responsive to the speed of the input shaft, connections between said ratio-varying means and both the governor and the manually operable member, said connections including a differential lever whereby said manually operable member may first operate said fuel supply means and thereafter, jointly with said governor, control said ratio-varying means through the instrumentality of said differential lever.

5. The invention defined by claim 4, said connections also including an adjustable part the adjustment of which is operable to modify the action of the governor.

6. The invention defined by claim 4, said governor having as a part thereof a plurality of preloaded springs to effect an operation in which, through certain ranges of engine speed, the governor is incapable of shifting the driving ratios.

7. The invention defined by claim 4, said governor having as a part thereof two pre-loaded springs to effect an operation in which, through certain changes of engine speed, the governor is incapable of changing the driving ratios.

8. In a motor vehicle having an engine and an infinitely variable transmission, means to regulate the fuel supply for the engine, means to control the driving ratio of said transmission, a manually operable member, mechanism including a differentially operable element by which said manually operable member may first open said fuel-regulating means and thereafter manipulate said ratio-controlling means, said mechanism including a device to effect the closure of the fuel-regulating means prior to the return of the ratio controlling means to its initial position when decelerating.

9. The invention defined by claim 8, said device comprising a dashpot.

10. In a motor vehicle having an engine and an infinitely variable transmission, means to regulate the fuel supply for the engine, means to control the driving ratio afforded by said transmission, manually operable means to operate said fuel-regulating means and said ratio control means, and a governor connected to and adapted to operate said ratio control means independently of said fuel regulating means, and adjustable means to modify the normal action of said governor upon said ratio control means.

11. The invention defined by claim 10, said adjustable means being also operable to permit a manual shift toward low speed when decelerating to thereby render the engine available as a brake to check the speed of the car.

12. In combination with an engine having a fuel supply valve, and an infinitely variable transmission, control means movable to change the ratios provided by said transmission, a differential lever, adjustable means between said lever and said ratio control means, a governor responsive to the speed of the input shaft of said transmission, connections between said governor and said differential lever, a manually operable member, a second differential lever, a connection between said second differential lever and said valve, a connection between said second differential lever and said first differential lever, a plurality of differential yielding means oppositely operable upon said second differential lever whereby the fuel supply valve and the ratio control means may be operated by the manually operable member in sequence.

13. The invention defined by claim 12, the connection from the governor and to the ratio control means including fluid pressure mechanism.

14. The invention defined by claim 12, the connection from the governor to the ratio control means including power servo mechanism.

15. In combination, an engine, a change speed mechanism of the infinitely variable type, a governor responsive to engine speed to control the change speed transmission, manually operable means to modify the action of the governor to effect variation in engine performance and economy in operation together with engine throttle manipulating means, said last-named means being also operable, by a continuation of its throttle opening movement, to control the transmission ratio subsequently to opening the throttle.

16. In combination, an engine, an infinitely variable transmission, means to change the driving ratio of said transmission, a manually operable member, a differential lever, power servo mechanism, said power servo mechanism and said manually operable member operable through said lever to actuate said means, and mechanism associated with said power servo mechanism to modify the rate of shifting.

17. The invention defined by claim 16, said last-named ratio-modifying mechanism comprising resilient means.

18. The invention defined by claim 16, said last-mentioned ratio-modifying means comprising adjustable valve means.

19. In a motor vehicle, the combination of an engine with a throttle and a change speed transmission having an input shaft, means for varying the driving ratio of said transmission, an operable member for said throttle, a governor responsive to the speed of the input shaft, connections between the ratio-varying means and both the governor and the operable member, said connections including mechanism whereby the governor and the operable member may be independently or jointly operable to influence the position of the ratio-varying means for a given position of adjustment of the throttle.

20. For use with an engine and a change speed transmission, a throttle for said engine, ratio controlling means for said transmission, a manually operable member to determine the position of said throttle and movable beyond a position corresponding to full open throttle, a governor to control the position of said ratio controlling means, and connections between the manually operable member and the ratio controlling means whereby said ratio controlling means is operated jointly by the governor and by the manually operable member in positions of the latter beyond the position corresponding to full open throttle.

21. In a motor vehicle, the combination of an engine with an infinitely variable speed ratio transmission, means for regulating the engine speed, means to vary the transmission ratio, a governor to control the last mentioned means, and manually operable means to operate the engine speed regulating means during a first range of its motion, and connections whereby after a predetermined movement it controls, by a further movement in the same direction and jointly with the governor, the ratio varying means.

22. In a motor vehicle, the combination of an engine with an infinitely variable speed ratio transmission, means for regulating the engine speed, means to vary the transmission ratio, a governor to control the last mentioned means, and manually operable means to operate the engine speed regulating means during a first range of its motion, and connections whereby after a predetermined movement it controls, jointly with the governor, the ratio varying means, said connections including differential lever means whereby the action of governor and manually operable means upon the ratio changing means are opposed.

23. In a motor vehicle, the combination of an engine with an infinitely variable speed ratio transmission, means for regulating the engine speed, means to vary the transmission ratio, a governor to control the last mentioned means, and manually operable means to operate the engine speed regulating means during a first range of its motion, and connections whereby after a predetermined movement it controls, jointly with the governor, the ratio varying means, said connections including differential lever means whereby the action of governor and manually operable means upon the ratio changing means are opposed, together with other manually operable means connected to said connections to modify the action of said governor.

JACOB EHRLICH.